US006706363B2

(12) United States Patent
Honda et al.

(10) Patent No.: US 6,706,363 B2
(45) Date of Patent: Mar. 16, 2004

(54) MAGNETIC RECORDING MEDIUM, ITS PRODUCTION METHOD AND MAGNETIC STORAGE DEVICE USING THE MEDIUM

(75) Inventors: Yoshinori Honda, Hiratsuka (JP); Yuuichi Kokaku, Yokohama (JP); Toshinori Ono, Odawara (JP); Shigehiko Fujimaki, Machida (JP); Hiroyuki Kataoka, Naka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/928,421

(22) Filed: Aug. 14, 2001

(65) Prior Publication Data

US 2002/0146532 A1 Oct. 10, 2002

(30) Foreign Application Priority Data

Feb. 2, 2001 (JP) ........................................ 2001-026246

(51) Int. Cl.[7] ................................................. D06N 7/04
(52) U.S. Cl. ................ 428/141; 428/408; 428/694 TC; 427/131; 427/533
(58) Field of Search .................. 428/694 TC, 408, 428/141; 427/533, 131, 902

(56) References Cited

U.S. PATENT DOCUMENTS 6,312,798 B1 * 11/2001 Ma et al. ..................... 428/336

FOREIGN PATENT DOCUMENTS

| JP | 1-263912 | 10/1989 |
| JP | 9-219020 | 8/1997 |
| JP | 2000-339658 | 12/2000 |

* cited by examiner

Primary Examiner—Stevan A. Resan
(74) Attorney, Agent, or Firm—Mattingly, Stanger & Malur, P.C.

(57) ABSTRACT

A magnetic recording medium is provided in which film thickness of the DLC layer is 5 nm or less. A tangential force of the magnetic head is small. The magnetic recording medium has excellent durability to sliding property. A magnetic storage device can be realized that is capable of stable floating of the magnetic head at 10 nm or less. The magnetic recording medium has a primary coat layer, a magnetic layer, and an overcoat layer on a substrate, wherein the overcoat layer is composed of a DLC film, and in an area in which depth from the surface of the DLC film is 13 Å or less, there is formed a CN bond.

10 Claims, 9 Drawing Sheets

SURFACE OF DLC FILM BEFORE THE TREATMENT OF THIS INVENTION

FIG. 9(b)

SURFACE OF DLC FILM TREATED BY THIS INVENTION
(NITROGEN PLASM TREATMENT)

MAGNETIC RECORDING MEDIUM, ITS PRODUCTION METHOD AND MAGNETIC STORAGE DEVICE USING THE MEDIUM

BACKGROUND OF THE INVENTION

1. Field of the Invention

The present invention relates to structure of a magnetic recording medium such as a magnetic disc, and particularly controls surface roughness in a final form by means of technique concerning surface treatment of a overcoat of a magnetic recording medium corresponding to ultra-low floating of a magnetic head.

2. Description of the Related Art

Figure 1:
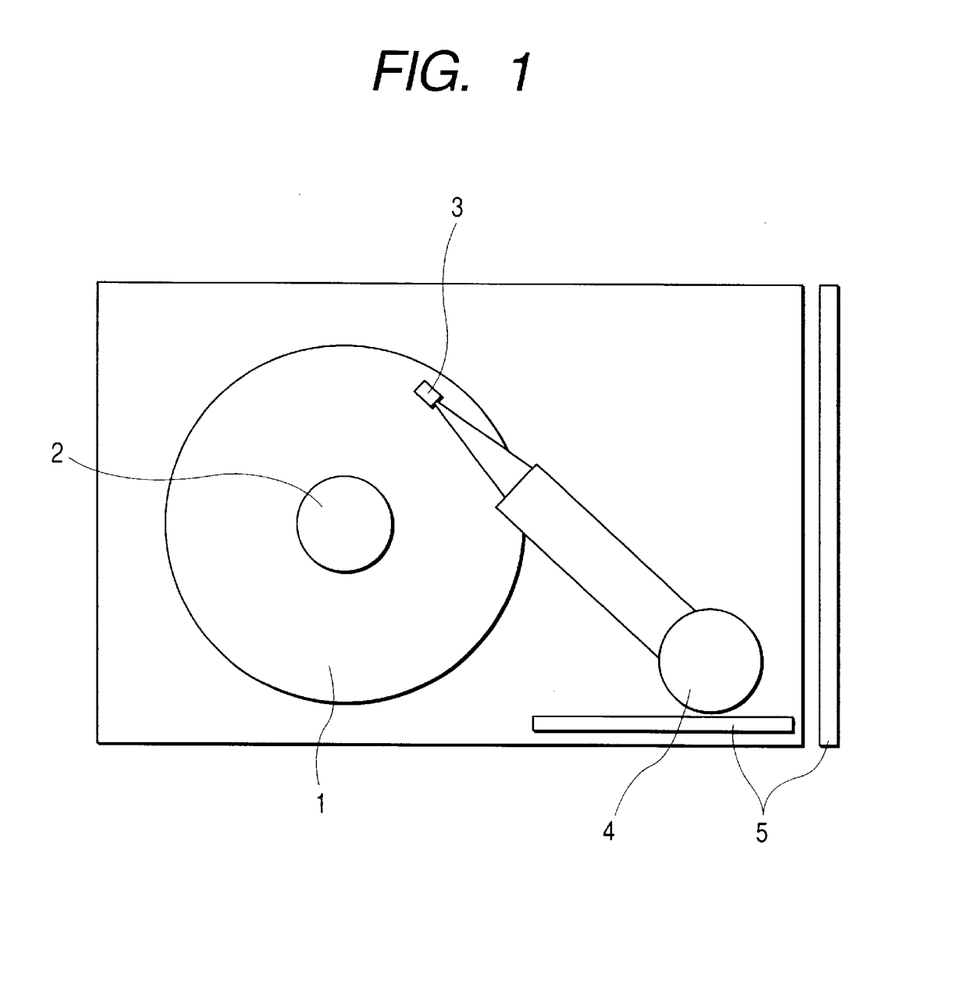
FIG. 1 is a outline view showing a magnetic storage device.

Generally, the magnetic storage device is, as shown in FIG. 1, comprised of a magnetic recording medium 1, a spindle 2 for holding and rotating it, a magnetic head 3, which performs reading and writing, a servomechanism 4 for positioning the magnetic head, and an electric circuit 5 for driving them, and these are combined together to constitute one magnetic disc drive.

Also, the magnetic recording medium is generally comprised of a metallic undercoat layer, a magnetic layer, a protective layer, and a lubricating film layer on a nonmagnetic substrate, and for characteristic properties required for the magnetic recording medium, not only R/W characteristics, but also matters concerning resistance to sliding property and the like such as damages on a surface of the medium by the contact with a magnetic head become important. Particularly, as regards a surface of the substrate, there is generally used a method for preventing the magnetic head from adhering to a magnetic disc by forming a fine groove by circumferential or non-oriented grinding called "texture" due to a machining method using fine abrasive grains.

Also, as other methods, there are a method (method called "depotexture") in which a similar effect to the texture is obtained by forming a substrate or a magnetic layer with a fine projection on the surface thereof by means of sputtering, and a method (etching texture method) for obtaining the similar effect by, after formation of a overcoat, coating with Teflon particles or the like as masking material, etching the surface by a dry etching method, and machining the surface of the protective layer to form irregularities on the protective layer itself, and the like.

The object of either method is mainly to prevent the magnetic head from sticking onto the magnetic disc, and to confirm reliability by means of contact start stop (hereinafter, referred to as "CS/S"). In recent years, however, in these days in which as particularly the recording density becomes higher, flying height of the magnetic head has reduced less than 10 nm, a lamp load system (method for placing the magnetic head on the magnetic disc after the magnetic disc is kept rotated) has mainly been used in place of the CS/S system, and it has become impossible to represent a durability of a data surface with which the actual magnetic head comes into contact irregularly while floating by means of a conventional evaluation method for CS/S durability, adhesive force and the like.

In the conventional technique, there has been generally used a method for reducing the damage caused by a shock at the time of contact by providing the data surface with a fine groove called "texture" (hereinafter, referred to as TEX) by machining work, and for preventing the magnetic head from sticking using lubricant. According to this method, TEX machining itself means to provide the substrate with surface roughness, and if the surface roughness becomes large, the amount of floating of the magnetic head becomes higher inevitably, and a head take-off height (Hto), which is a minimum height for the magnetic head to float from the surface of the disc, also becomes higher. Therefore, it cannot withstand the use in the extra-low floating area. Further, if the substrate has surface roughness to some extent, it will be emphasized as it is, or more than it to appear on the surface roughness of the under film, the magnetic film, and the protective layer to be laminated naturally on the substrate, and the surface roughness of the magnetic recording medium finally completed will become equal to or higher than that of the substrate. Thus, the surface of the substrate for use is required to be made as flat as possible, and for this reason, the characteristics of resistance to sliding properties to be required for the protective layer and the lubricating film will require to have as much durability as possible. Also, in order to solve these problems, such high-hardness, high-strength protective layer as diamond-like carbon film (amorphous hard carbon hydride film)(in the present specification, described as DLC film) is adapted to be required.

For a process for the DLC film, however, the CVD system, PE(Plasma Enhanced)CVD system, IBD(Ion Beam Deposition) system, and others have been used. The DLC film formed by means of these system has features in which the covering rate of the film is very high, the surface is made ultra-flat, and free radicals and the like which connect to a functional group of the lubricant become less. When such a surface is coated with lubricant, the lubricant is difficult to adhere, and is easy to scatter. Also, when the magnetic head comes into contact with the ultra-flat surface, a tangential force at the time of contact becomes great. The flatter the surface becomes, the easier this occurs, which causes the crash.

Further, the protective layer thickness to be required becomes equal to or less than 5 nm as the recording density becomes higher. According to the prior art, in order to enhance the strength of the protective layer, a nitrogen ion has been implanted into the DLC film by means of the ion implantation in Japanese Patent Laid-Open Application No. 1-263912. According to the Laid-Open Application, a nitrogen ion implantation layer is formed on the surface of the DLC film thereby, and the hardness of the film becomes higher toward the surface layer. In this Laid-Open Application, however, as the condition for the ion implantation, the nitrogen ion is accelerated at 5 keV to 60 keV. When accelerated under this condition, it reaches to a depth of about 270 Å to 3600 Å, very high acceleration is given to the overcoat thickness being 100 to 200 Å, and even though an etching phenomenon occurs before the implantation, it is a phenomenon quite in order. Further, since it is assumed that there is no spacing loss on the surface obtained as described above, and since the nitrogen ion accelerated actually reaches the magnetic layer, it is evident that the magnetic recording characteristics of the magnetic layer will be certainly affected, and it is considered that any increase in error rate due to dropout cannot be expected.

These problems have a similar result even if the method specified in Japanese Patent Laid-Open Application No. 9-219020 is employed, and in a portion as thick as 100 to 200 Å in overcoat thickness, depth of implantation may be controlled by reviewing the implantation condition. Under present circumstances, however, the protective layer thickness is equal to or less than 50 Å, and it becomes difficult by means of these methods. Further, the nitrogen ion entered by implementation bonds to carbon, which is a basic composition of the DLC film, on rare occasion, and is none other than one physically entered.

Therefore, it can be seen that any improvement effects of such adhesive power of lubricant onto the DLC film as described above cannot be expected either. Also, since these methods are unable to control the form of the surface of the DLC film (it has been specified that the form does not change), the tangential force of the magnetic head at the time of contact is steadily rising, and any improvement in the tribological resistance to sliding operation is not wished.

SUMMARY OF THE INVENTION

Thus, in the present invention, there has been proposed a technique and a method for treating only an ultra-surface layer of the DLC film equal to or less than 5 nm with the aim of arbitrarily forming surface roughness on a DLC film, which is an exceedingly thin film of 5 nm or less, at surface roughness Ra of the substrate being 0.4 nm or less with an amount of floating of the magnetic head being 10 nm or less, that could not be achieved by the above-described prior art, and ensuring the durability to sliding operation in the ultra-low floating area with lubricant being easily deposited on the surface of the DLC film.

Since the conventional method using the ion implantation can be applied only to the high-voltage and exceedingly small current condition for increasing the efficiency in high vacuum under the feature of the gun, it has been decided in the present invention to pursue the study using an ion beam gun, that has been studied to form the DLC film in recent years.

In order to effectively prepare the DLC film, these ion beam guns prepare hard DLC films by decomposing gas such as ethylene, methane and acetylene which become raw material, with plasma for ionization, and accelerating by applying energy of about 200 eV onto the substrate. It is possible to arbitrarily control accelerating voltage, and to enter to depth of about 10 Å at 150 eV for an ultra-thin overcoat of 5 nm or less, and has features that controllability in the depthwise direction is good, it is possible to raise the ion current density to about 5 mA/cm$^2$ at lower voltage than the ion implantation, and the throughput efficiency is high. In this connection, in the ion implantation, several tens kV and 1 mA/cm$^2$ at maximum are applied, and voltage is increased instead of being unable to increase the current density.

In the present invention, as gas to be used for treatment, there has been adopted nitrogen. As the reason, it has been considered that on a surface having a CN bond, fluorine lubricant is prone to adhere, and that since the atomic radius of nitrogen is as small as 0.53 Å as compared with 1.91 Å of Ar, or the like, it is possible to prevent the sputtering phenomenon, that is, the protective layer from being damaged, and to reform the surface while particularly making the most of a feature of the DLC film being rigid.

Figure 2:
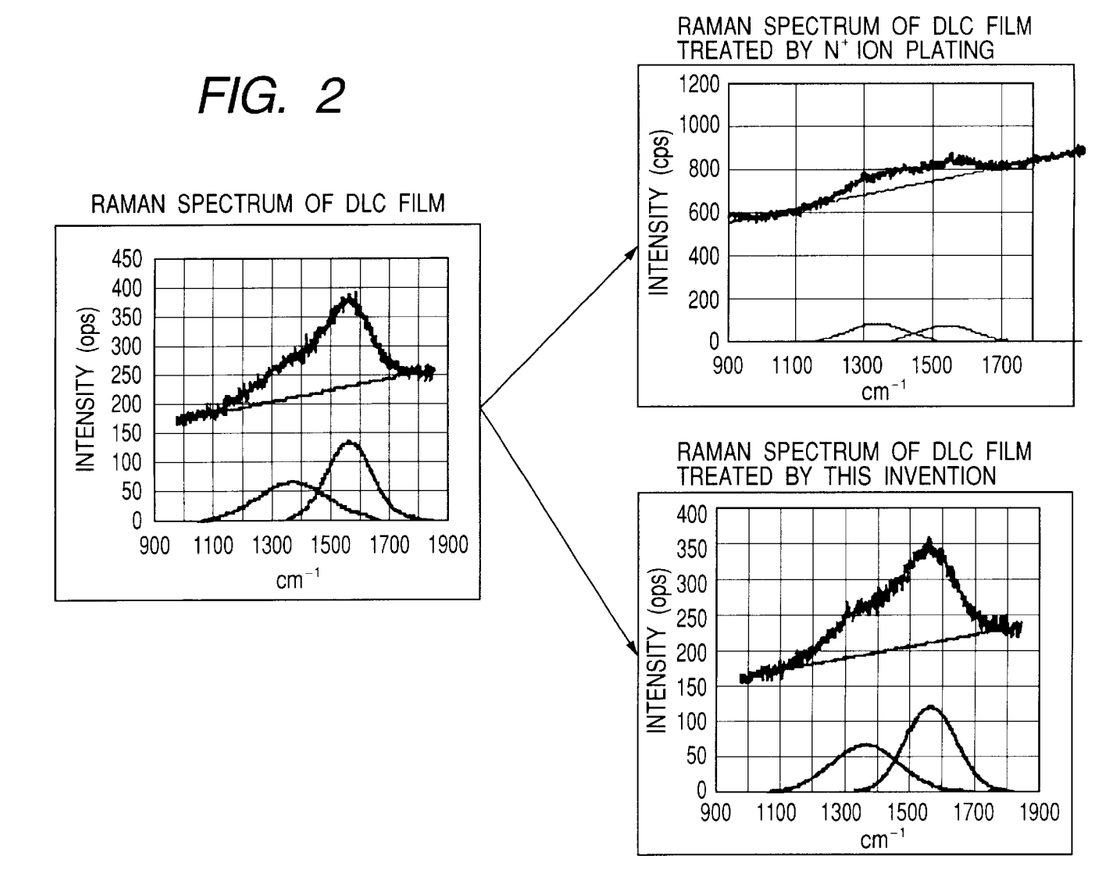
FIG. 2 is a view showing comparisons of changes based on to Raman spectrum of the film quality of the DLC film.
Figure 3:
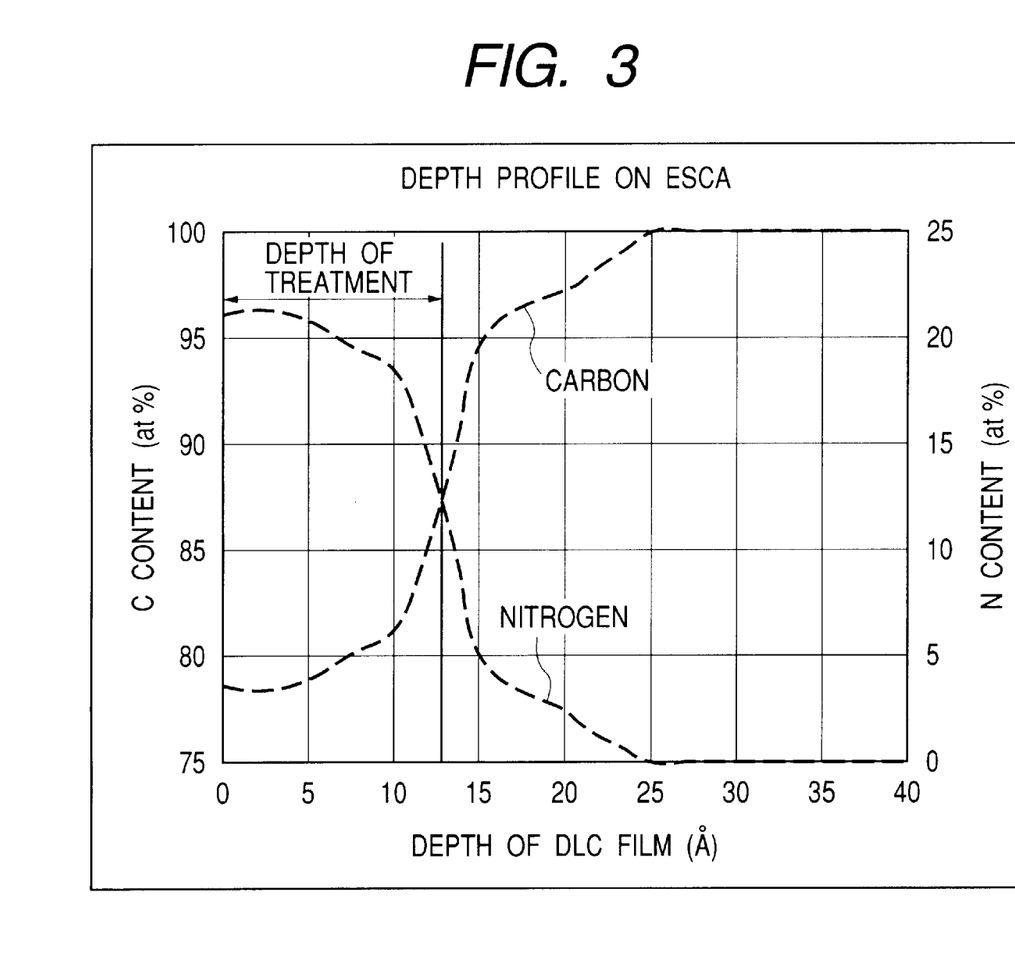
FIG. 3 is a view showing a depth profile of N content in the film after treatment according to the present invention together with an amount of carbon.

Basic data actually obtained are shown in FIGS. 2 and 3. FIG. 2 shows a Raman spectrum of the DLC film on the surface of the disk prepared by treatment according to the present invention. In such a method having great shock as the conventional one, it can be seen that the original film quality of the DLC film is not maintained, but the film itself has been changed. In the treatment according to the present invention, however, it can be seen that the spectrum of the DLC film itself is not changed. FIG. 3 shows a result obtained by measuring an amount of nitrogen in the DLC film of a similar sample in the depth-wise direction through the use of an ESCA (ELECTRON SPECTROSCOPY FOR CHEMICAL ANALYSIS).

The measuring apparatus and measuring conditions are shown below.

Measuring apparatus: QUANTUM 2000 (SCANNING ELECTRON SPECTROSCOPY FOR CHEMICAL ANALYSISS MICROPROBE SYSTEM) manufactured by PHYSICAL ELECTRONICS, INC.

Measuring Condition

X-rays generating condition: Beam diameter 200 $\mu$m-44W, Al target and monochrome X-rays (AlK$\alpha$) have been used as an excitation source.

Analysis area mode: Point analysis

Diameter of beam for use: 200 $\mu$m$\Phi$

Analyzer condition: Analysis mode MULTIPLEX, pass energy 117.4 eV, step size 0.125 eV Angle of ejection: angular resolution; quantitative calculation from a narrow spectrum has been performed at TAKE OFF=6 to 75°.

FIG. 3 shows one example of the result of the ESCA analysis. The abscissa axis indicates film thickness from the surface (0) of the DLC film, and the ordinates axis indicates changes in nitrogen density and carbon density in the depth-wise direction. In this case, the carbon density increases toward the depth direction from the surface, the nitrogen density shifts at substantially constant density from the surface to the depth of 10 Å, and as the entered depth, it can be observed to about 13 Å, which is a position where the carbon density and the nitrogen density intersect. In the case of accelerating voltage being 150 eV, since entry to the depth of about 10 Å is calculated from the simulation, this result substantially coincides with the calculated value.

From the foregoing, it can be also seen clearly that the amount of nitrogen more increases toward the ultra-surface layer according to the present invention. The accelerating voltage at this time is 200V in setting(about 150 eV), and from these data, it can be seen that the depth of penetration of N is about 10 Å.

Figure 4:
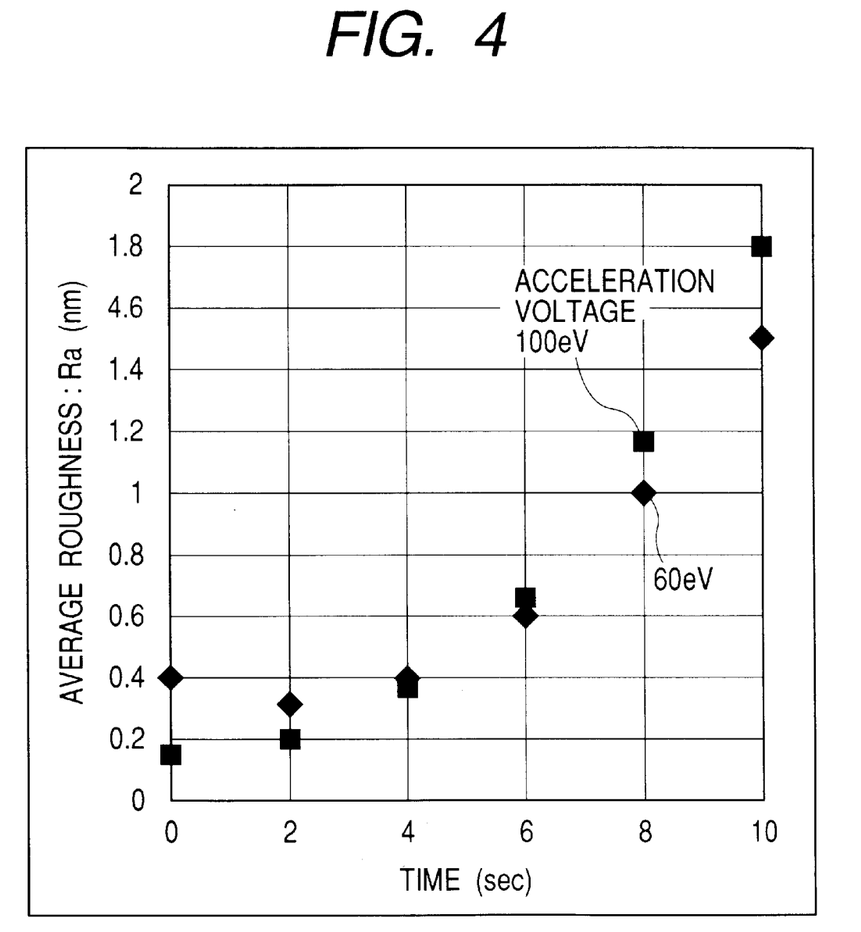
FIG. 4 is a view showing time dependency of surface roughness of a DLC film subjected to treatment according to the present invention.

Further, in order to observe the form of the surface, observation using an atomic force microscope (AFM) has been performed, and changes in the surface roughness are shown in FIG. 4. From this figure, it could be confirmed that it is possible to arbitrarily change the original roughness of the DLC surface according to the present invention.

In this connection, in this measurement, the surface roughness has been calculated from the surface form obtained by measuring through the use of an interatomic power microscope NANOSCOPE [II] manufactured by Digital Instruments, Inc. As an index for the surface roughness here, numerical values of roughness to be defined in the following definition have been used. For details, please refer to their instruction manual.

The average value: Ra of a surface on which the center plane is made as the reference is represented by a numerical formula 1, and in this case, f(x, y) has the center plane made as the reference, and a surface Lx and Ly represents dimension of the surface. Numerical Formula 1

$$Ra = F(1 \cdot LxLy)\left[\int_0^{Ly}\left(\int_0^{Lx} |f(x,y)|\,dx\right)dy\right];$$

As shown in the definition of Ra, defined in the description of the AFM, the surface according to the present invention has been set to 0 in the direction of the depth of the surface, that is, the top surface having the center plane to be defined by the surface roughness Ra described previously.

In this connection, the measuring area has been set to 2.5 μm square.

DETAILED DESCRIPTION OF THE PREFERRED EMBODIMENTS

As described above, there is positive proof that the object can be achieved according to the present invention.

Hereinafter, the description will be made of the evaluation result concerning the characteristic properties of a magnetic recording medium prepared in accordance with the present invention, including the preparation method.

Figure 5:
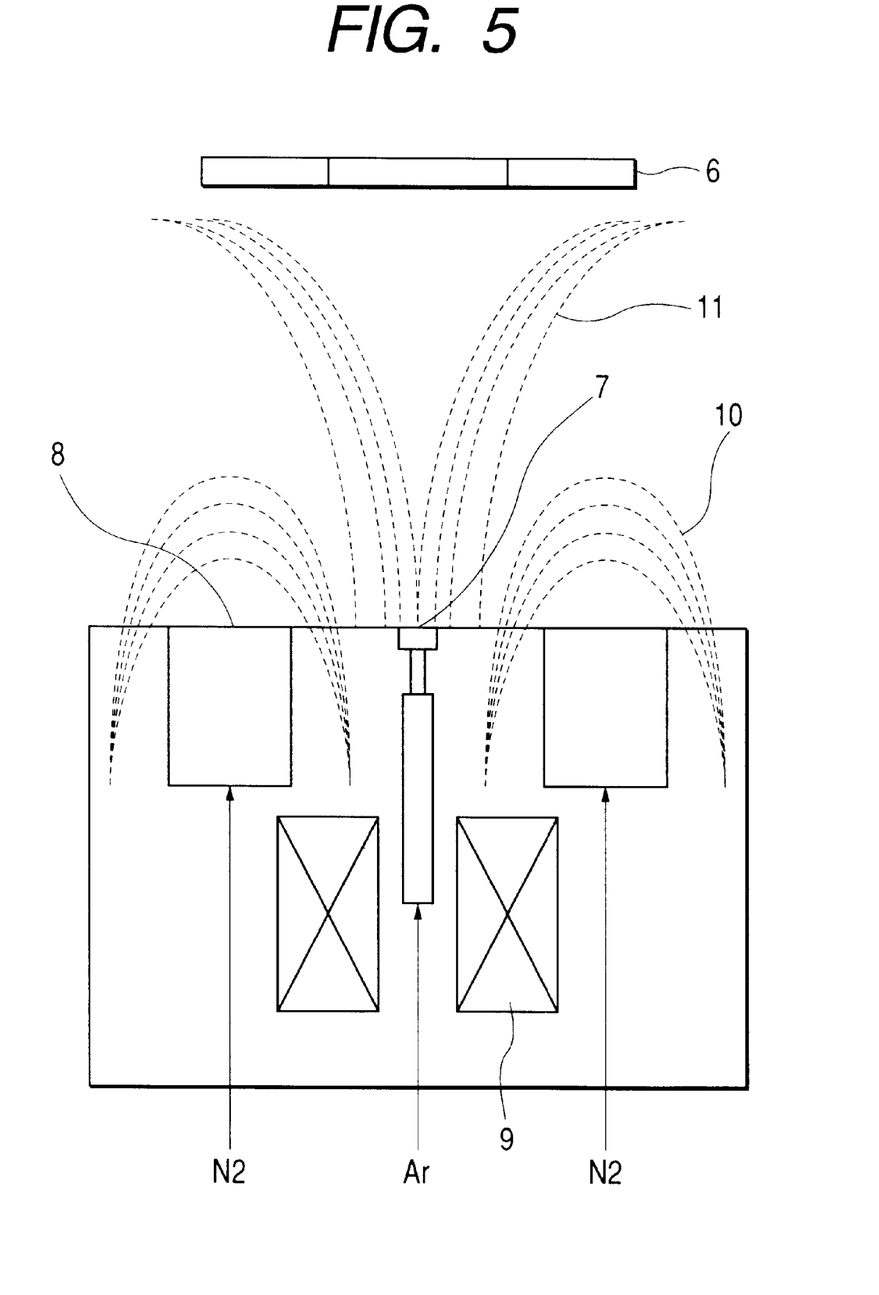
FIG. 5 is a schematic view showing an ion gun used in an embodiment according to the present invention.

First, on implementing the present invention, an ion beam gun having the structure shown in FIG. 5 has been used. In the structure of this gun, an electron: $e^-$ is supplied from a hollow cathode 7 at the center to a magnetic disc 6 and an anode 8 to cause plasma to the anode 8, the ion generated by this plasma accelerates the ion on the magnetic disc 6 by means of a potential difference (accelerating voltage) with ground. At this time, an electron is supplied from the hollow cathode at the same time, the ion is neutralized, and therefore the surface of the magnetic disc will not be charged. In this connection, reference numerals 11 and 10 denote a magnetic field and a line of magnetic force respectively. As a role of increasing the density of plasma at the anode, electric current is caused to flow through an electromagnet 9 to thereby cause the magnetic field 11 and the line of magnetic force 10. The feature of this gun is that it has no component to be consumed because it has no filament for supplying an electron unlike the so-called ion beam, nor has any grid for acceleration or neutralization.

For a magnetic disc to be treated, there has been used a glass substrate produced by HOYA having surface roughness Ra of 0.3 nm as a substrate, on which CoNi alloy of 30 nm as a under seed layer, a CrMo film of 25 nm as a under layer, a CoCrPtB film of 22 nm as a magnetic layer, and a DLC film of 4 nm as a protective layer have been formed respectively. On forming as the film, there has been used MDP-250B manufactured by INTEVAC INC. The substrate temperature is 250° C.

The magnetic disc 6 having such a history as described above has been put in a treating chamber, which has been evacuated at 1E-5 Pa or less. The treatment condition of the DLC film surface is shown in Table 1. H-A denotes a current value of the hollow cathode; A—A, a current value of the anode; and AtoG, voltage between the anode and the ground.

TABLE 1

| Treatment condition | H-A (Amp) | A-A (Amp) | A to G (V) | ArFlow (sccm) | N2Flow (sccm) | Press (Pa) | Time (sec) |
|---|---|---|---|---|---|---|---|
| 1st Embodiment | 2 | 5 | 60 | 20 | 20 | 5.3E-1 | 3 |
| 2nd Embodiment | 2.5 | 6 | 60 | 20 | 40 | 9.0E-2 | 2.5 |
| 3rd Embodiment | 4 | 8 | 60 | 20 | 40 | 9.0E-2 | 2 |
| 4th Embodiment | 2.5 | 10 | 60 | 20 | 40 | 9.0E-2 | 3 |
| 5th Embodiment | 2.5 | 8 | 100 | 15 | 80 | 3.8E-2 | 2 |
| 1st Comparison | Sputter CN film: 4nm (Nitrogen content 18.5 at %) | | | | | | |
| 2nd Comparison | DLC film: 4nm untreated goods | | | | | | |

As the treatment procedure, after the evacuation, Ar is caused to flow through the hollow cathode 7, and after discharging of the hollow cathode 7, nitrogen, which is treated gas, is caused to flow through the anode 8. After the anode 8 is caused to discharge, current is caused to flow through an electromagnet 9, and voltage (accelerating voltage) between the anode 8 and the ground has been set to become an arbitrary value. After the condition is satisfied, the magnetic disc 6 has been inserted into the front surface of the gun to perform the treatment. The treatment time has been controlled by a timer and when the treatment is finished, all power supply and all gas have been stopped.

As a comparison, a sputter carbon nitride film 4 nm and an untreated DLC film 4 nm have been prepared.

As the evaluation method, the nitrogen density to a depth of 5 Å from the surface of the DLC film has been measured through the use of the ESCA (ELECTRON SPECTROSCOPY FOR CHEMICAL ANALYSIS). The ESCA means an X-ray photoelectron spectral analyzer. An X-ray source is utilized to generate a photoelectron, and energy based on chemical bonding inherent in material is measured, whereby the amount of the material can be determined. The film quality was measured by presence or absence of variations in the Raman spectrum, the adherence of the lubricant was measured using FT-IR, and the forms of the surface were compared by measuring Ra by means of AFM.

In this respect, for the lubricant, fluorine lubricant was used, and the lubricant concentration was adjusted so as to have film thickness of about 17.5 Å on an untreated DLC film using solution of 0.0750%.

For evaluation of the magnetic disc apparatus, a high-speed tangential force when the MR magnetic head is brought into a contact state at a number of rotation of 12000 RPM was measured for comparison.

Further, the disc was installed into the magnetic storage device, random seek was performed for 10000 hours at an amount of floating 5 nm of the magnetic head being constant, and thereafter, the read-write error was measured to compare fluctuations (an increase in error indicated by %). The result is shown in Table 2.

two unit and one unit among three units were crashed respectively, and thereafter any error could not be measured.

Further, in the present invention, the investigation was performed in detail for each adherence treatment process of the lubricant. As the reason, an amount of scattering of the lubricant from above the magnetic disc is affected by the number of rotation of the magnetic disc, the temperature of the magnetic storage device at the time of operation, and share ware caused by the magnetic head, and is attributable

TABLE 2

| Evaluation result | Nitrogen density (at %) | Presence or absence of change in film quality (Presence or absence) | LB adherence (Å) | Surface roughness: Ra (nm) | High-speed tangential force (mN) | Error increase ratio (%) |
|---|---|---|---|---|---|---|
| 1st Embodiment | 18.7 | Absence | 22 | 0.42 | 15 | 0.15 |
| 2nd Embodiment | 19.88 | Absence | 22 | 0.53 | 13 | 0.2 |
| 3rd Embodiment | 21.3 | Absence | 22 | 0.8 | 10 | 0.1 |
| 4th Embodiment | 22 | Absence | 22 | 1.35 | 8 | 0.12 |
| 5th Embodiment | 20.45 | Absence | 22 | 0.48 | 12 | 0.21 |
| 1st Comparison | 18.5 | — | 19 | 0.6 | 285 | 5.3 |
| 2nd Comparison | 0 | — | 17 | 0.31 | 320 | 3.4 |

From the foregoing evaluation result, in a magnetic disc according to the present invention, it is possible to improve the adherence of the lubricant (LB) as compared with the DLC film as single substance about 30% or higher at nitrogen density of the extra surface being about 20 at % without causing any changes in the film quality of the DLC film itself, to arbitrarily change the surface roughness from the roughness of the substrate to about Ra of about 1.5 nm, and to reduce the high-speed tangential force to half of the conventional one or less, and it could be confirmed that the error is hardly increased.

Figure 8:
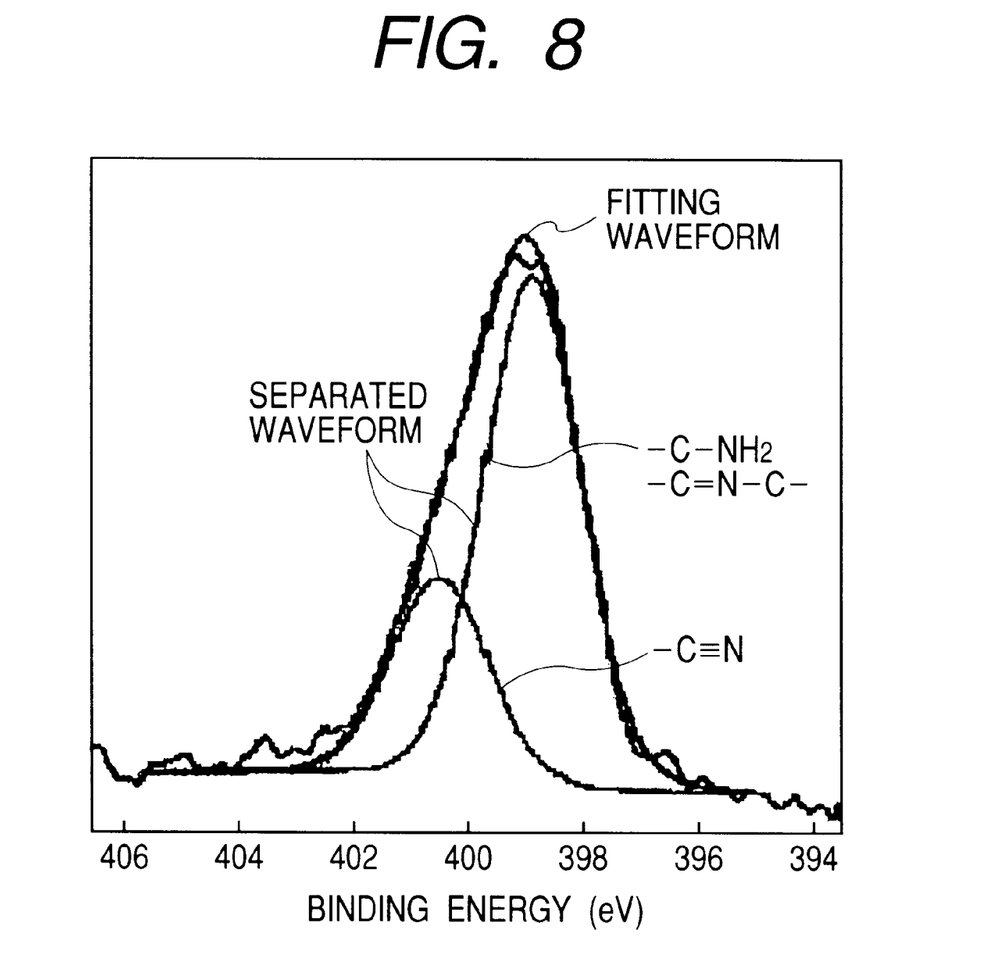
FIG. 8 is a view showing ESCA data on the surface of the DLC film implemented according to the present invention.

In the respective embodiments, attention was focused on peak of N1s from the data of ESCA as shown in FIG. 8 for analysis. In this energy band, however, each of —C—N, —C=N, and —C≡N is contained as a bond of CN, and the peak cannot be clearly separated. Therefore, it is considered to be a mixture of —C—N, —C=N, and —C≡N bonds as shown in the figure.

The medium prepared under the condition shown in the Table 1 was mounted on HDD, and a random seek test for 10000 hours was conducted. As a result, none of the embodiments was crashed, but in the first and second comparisons, to the adherence characteristic of the lubricant onto the overcoat surface. This characteristic is a factor which determines the durability to sliding property of the magnetic disc. The treatment condition is shown in Table 3, and the result is shown in Table 4.

TABLE 3

| Treatment condition | H-A (Amp) | A-A (Amp) | A to G (V) | ArFlow (sccm) | N2Flow (sccm) | Press (Pa) | Time (sec) |
|---|---|---|---|---|---|---|---|
| 6th Embodiment | 2.5 | 8 | 8.5 | 10 | 10 | 1.5E-2 | 3 |
| 7th Embodiment | 2.5 | 10 | 8.5 | 10 | 10 | 1.5E-2 | 3 |
| 8th Embodiment | 1.5 | 10 | 1.30 | 40 | 100 | 5.3E-2 | 3 |
| 3rd Comparison | Sputter CN film: 4nm (Nitrogen content 15.3 at %) | | | | | | |
| 4th Comparison | DLC film: 4nm untreated goods | | | | | | |

On preparing the sample, the film deposition process was performed in the same manner as described above. As regards the comparison, as a third comparison, a sputter CN film (N content 15.3%) with thickness of 4 nm and a DLC film untreated with thickness of 4 nm have been prepared. A DLC film surface treatment condition of the sixth to eighth embodiments is that the deviation range is taken larger than the first to fifth embodiments as shown in Table 3.

In order to evaluate the adherence of the lubricant on the above-described samples, 0.1% concentration solution of the fluorine lubricant was prepared, and the sample was coated at a fixed pull-up speed at normal temperature. The film thickness immediately after coated was assumed to be adhered film thickness, next in order to dry in the atmosphere, heat treatment was conducted at 80° C. for two hours, and thereafter, the film thickness was assumed to be film thickness after heat treatment. Further, in order to confirm an adsorbed state with the protective layer, it is dipped in fluorine solvent used as a solvent, and the remaining lubricant film thickness after pulled up was assumed to be film thickness after rinsed. The thicker the film thickness after rinsed is, the surface of the protective layer and the lubricant are more well-suited to each other, and the compatibility becomes an index representing easiness of the lubricant to adhere to the protective layer. Also, it is a fixed amount that represents this film thickness by a ratio to the film thickness after the heat treatment, and the remainder is a surplus amount. Also, as relative comparison of adherence, when the film thickness after rinsed of the fourth comparison is set to 1, a ratio of each of the respective samples to the film thickness after rinsed was represented as adherence ratio. Since the ratios of the surplus amount and the fixed amount change depending upon the initial coated film thickness (adherence) of the lubricant, in order to compare, it is necessary to standardize.

TABLE 4

| Lubricant adherence | Adherence (Å) | Film thickness after heat treatment (Å) | Film thickness after rinsed | Surplus amount (%) | Fixed amount (%) | Adherence ratio |
|---|---|---|---|---|---|---|
| 3rd Comparison | 21.63 | 20.60 | 0.93 | 95.47 | 4.53 | 0.22 |
| 4th Comparison | 20.20 | 19.08 | 4.26 | 77.65 | 22.35 | 1.00 |
| 6th Embodiment | 31.00 | 29.75 | 12.40 | 58.34 | 41.66 | 2.91 |
| 7th Embodiment | 29.50 | 28.60 | 8.28 | 71.05 | 28.95 | 1.94 |
| 8th Embodiment | 29.70 | 28.93 | 8.82 | 69.52 | 30.48 | 2.07 |

As a result, as shown in Table 4, the sputter CN film of the third comparison indicates the substantially same value as the DLC film of the fourth comparison in adherence and film thickness after heat treatment, but the film thickness after rinsed is reduced to about one fifth of that of the DLC film.

In comparison with them, in the sixth to eighth embodiments according to the present invention, the adherence and the film thickness after heat treatment are about 30 Å in either case, which is 1.5 times as high as that of the DLC film, and it can be seen that the coverage is great. Also, the film thickness after rinsed is 8 to 12.4 Å, and it can be seen that the adherence of the lubricant onto the DLC film is about two or three times advantageous. In this case, it is different from the adherence of Table 2, and this results from different concentration of the solution of the lubricant previously described. Simple comparison cannot be made.

Therefore, the fixed amount is about 1.3 or 1.9 times as high as that of the DLC film, and is capable of greatly contributing to reduced amount of scattering on the magnetic disc of the actual machine. The ratio of the fixed amount of the lubricant layer according to the present invention amounts to 29% or higher.

Figure 9A:
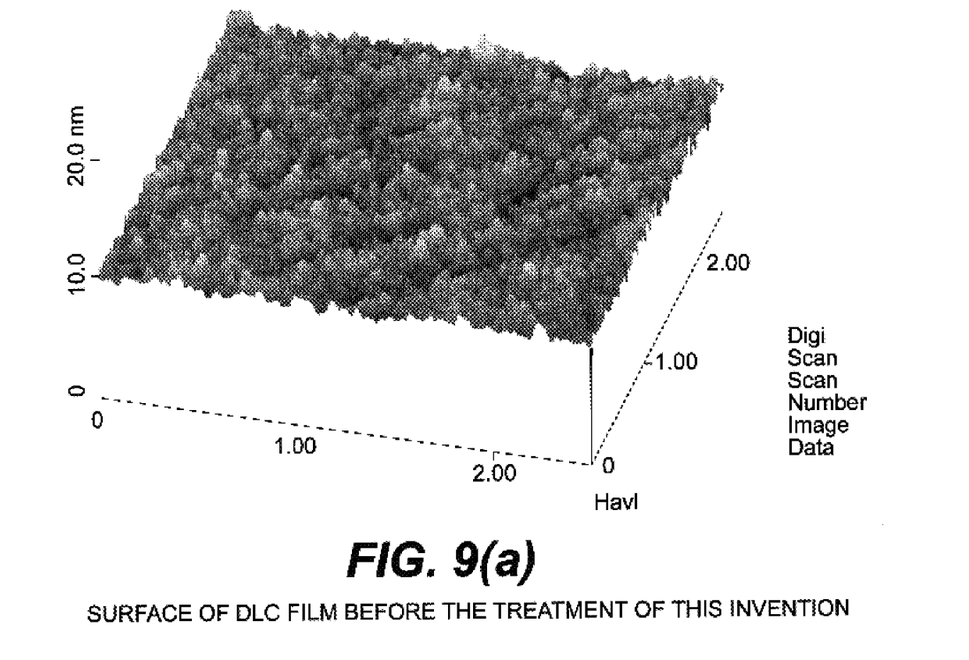
FIGS. 9(a) and 9(b) are views showing AFM image comparison data on the surface of the DLC film treated according to the present invention.
Figure 9B:
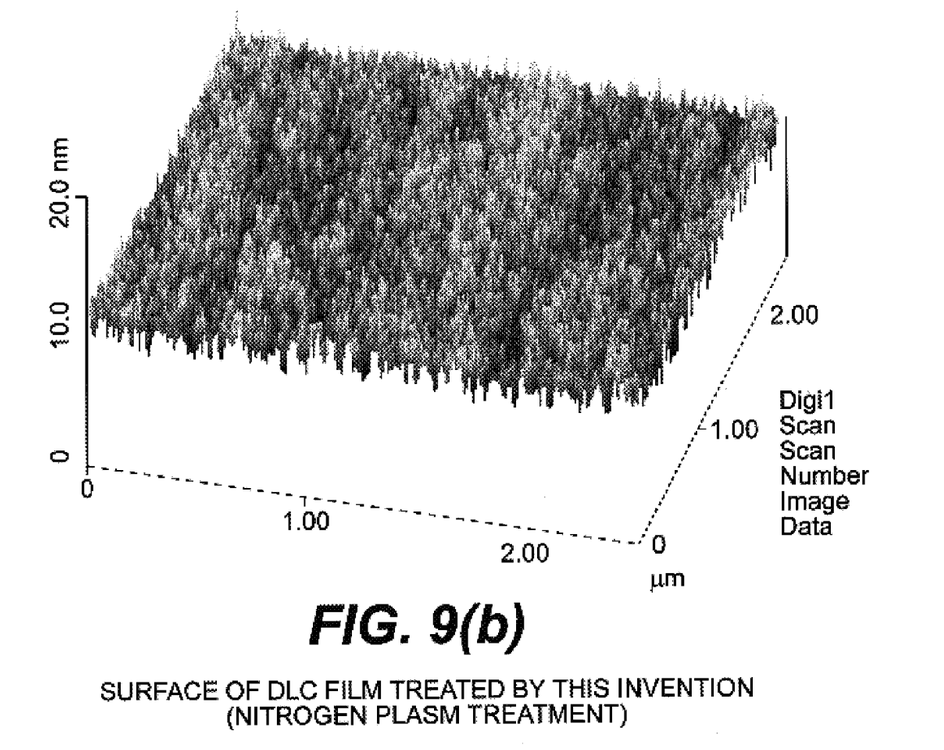

Also, FIGS. 9(a) and 9(b) shows an AFM image on the overcoat surface after N-treatment on the surface of the DLC film performed in accordance with the present invention in comparison with the untreated surface of the DLC film. As seen from this, there are formed finer irregularities on the DLC film surface treated in accordance with the present invention than untreated goods. Accordingly, it is considered that the high-speed tangential force can be deteriorated.

Figure 6:
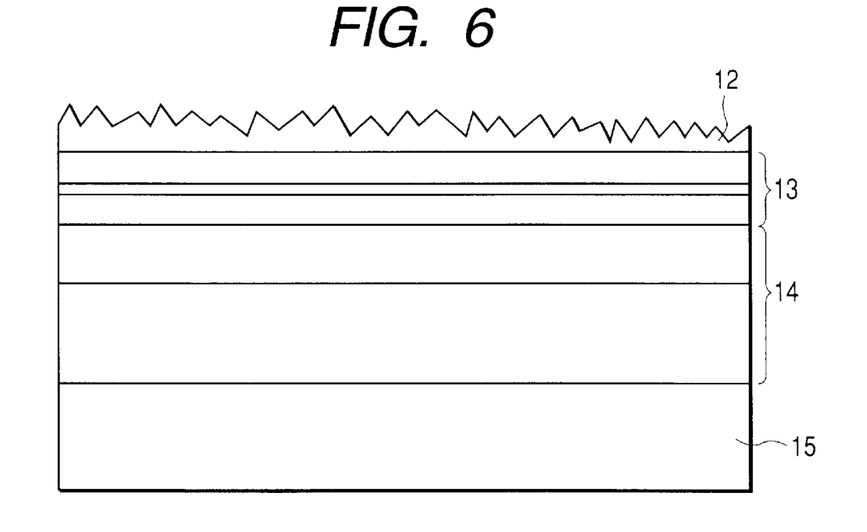
FIG. 6 is a view showing an example of layer structure of a magnetic disc according to the present invention.
Figure 7:
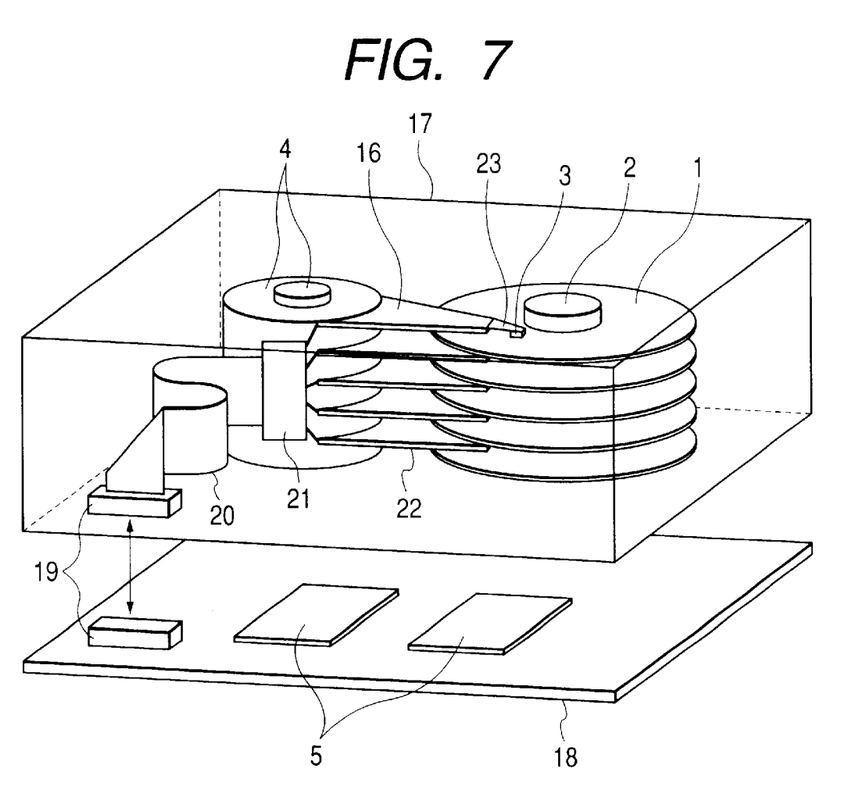
FIG. 7 is a view showing an example of structure of a magnetic storage device according to the present invention.

In this respect, FIG. 7 shows the outline of the magnetic storage device used in the present invention, and FIG. 6 shows an example of layer structure of the magnetic recording medium according to the present invention.

For the layer structure according to the present invention, a under layer 14 and a magnetic layer 13 are laminated on a glass substrate 15, on top of which there is laminated a protective layer (DLC film) 12, only whose surface has been treated with nitrogen.

Also, the magnetic storage device is constructed such that the magnetic recording medium 1 is installed into the spindle 2, and the magnetic head 3 arranged on the magnetic recording medium 1 is supported by a suspension 23 and a head arm 16, and is positioned by a servomechanism 4. A signal from the magnetic head 3 passes through a lead wire 22, passes through flexible flat wiring 20 from a lead wire assembled connector 21, and is signal-processed at an electric circuit 5 on a R/W circuit substrate 18 by a coupling connector 19. A housing 17, in which all of these are contained, is the magnetic storage device.

From the foregoing, according to the present invention, it is possible to obtain a high-reliability magnetic disc in an area, in which the amount of floating of the magnetic head is 10 nm or less at the overcoat thickness of 5 nm or less.

According to the present invention, it is possible to provide a high-reliability magnetic recording medium and magnetic disc apparatus, which is improved in magnetic head floating stability, high-speed contact tangential force, Hto and medium error, capable of high-density recording in an area in which ultra-low levitation is 10 nm or less.

What is claimed is:

1. A magnetic recording medium having a primary coat layer, a magnetic layer, an overcoat layer and a lubricating layer on a substrate, wherein said overcoat layer is composed of a DLC film, and a protruded portion of surface roughness on the surface of said DLC film is formed by CN bond, and said bond is composed of a mixture of —C—N, —C=N, and —C≡N bonds.

2. A magnetic storage device, wherein a magnetic recording medium according to claim 1 is installed in a rotationally-driven spindle, a magnetic head is positioned on the surface of said magnetic recording medium, and said magnetic recording medium rotates, whereby data is read and written on said magnetic recording medium.

3. A magnetic recording medium having a primary coat layer, a magnetic layer, an overcoat layer and a lubricating layer on a substrate, wherein said overcoat layer is composed of a DLC film, and in an area, in which a depth from the surface of said DLC film is 15 Å or less, most of a CN bond is formed.

4. The magnetic recording medium according to claim 3, wherein a nitrogen content based on said CN bond in said area is 5 at % or higher.

5. The magnetic recording medium according to claim 3, wherein a nitrogen content based on said CN bond in said area is 10 at % or higher.

6. The magnetic recording medium according to claim 3, wherein surface roughness of said substrate is 0.4 nm or less at average roughness Ra, and roughness of the surface of said DLC film is higher than surface roughness of said substrate, and is 2 nm or less at Ra.

7. The magnetic recording medium according to claim 3, wherein a protruded portion of surface roughness on the surface of said DLC film is formed by CN bond, and said bond is composed of a mixture of —C—N, —C=N, and —C≡N bonds.

8. The magnetic recording medium according to claim 3, wherein a ratio of a fixed portion of said lubricating layer is 25% or higher.

9. A magnetic recording medium having a primary coat layer, a magnetic layer, an overcoat layer and a lubricating layer on a substrate, wherein said overcoat layer is composed of a DLC film, and surface roughness on the surface of said substrate is less than 0.4 nm in Ra, and surface roughness on the surface of said DLC film is larger than that of the surface roughness on the surface of said substrate and is less than 2 nm in Ra.

10. A production method for a magnetic recording medium for forming at least a primary coat layer, a magnetic layer, an overcoat layer and a lubricating layer on a substrate in this order, wherein a surface of said DLC film is treated at accelerating voltage of a N (nitrogen) ion beam being 150 eV or less after said DLC film is formed.

* * * * *